May 2, 1967   N. GEORGE   3,317,853
GASEOUS LASERS
Filed May 12, 1966

NICHOLAS GEORGE
INVENTOR.

BY Samuel Lindenberg
ATTORNEY

United States Patent Office 3,317,853
Patented May 2, 1967

3,317,853
GASEOUS LASERS
Nicholas George, Pasadena, Calif., assignor to California Institute Research Foundation, Pasadena, Calif., a corporation of California
Filed May 12, 1966, Ser. No. 557,849
5 Claims. (Cl. 331—94.5)

This invention relates to gaseous lasers and more particularly to improvements therein.

This application is a continuation-in-part of application Ser. No. 249,004, filed Jan. 2, 1963 for Gaseous Lasers, by this inventor.

A gaseous laser usually includes a container in which a suitable gas or gas mixture can provide a light output as a result of a stimulated emission. The theory of the laser operation, briefly, is that a gas molecule is excited, or raised to a higher energy state, in which state it can be stimulated by an outside photon to release a photon in the course of which the molecule reverts to a lower state. Usually, in order to excite the gas molecules radio frequency energy is applied by means of electrodes positioned at the tube envelope. The applied RF excites any free electrons in the gas causing them to collide with the gas molecules whereby the gas molecules have their energy states raised. Thereafter, the excited molecules may be bombarded with photons from a stimulating light source which may be external or may be regeneratively circulated spontaneous emission.

It may thus be seen that both the initiation of excitation and the continued excitation of gas molecules is more or less random depending upon the presence of free electrons in the gas. Also, the excitation efficiency is strongly dependent on the energy distribution of these free electrons.

An object of this invention is the provision of a novel arrangement for controlling the energy distributions of the free electrons in a gas laser.

Yet another object of the present invention is the provision of a novel and unique arrangement for a gaseous laser for increasing the power output thereof.

Still another object of the present invention is the provision of structure for insuring that there are always sufficient excited electrons available for the operation of a gaseous laser.

These and other objects of the invention are achieved by inserting into the gas laser envelope a pair of grids comprising an electron emitting grid and an electrode to establish a field therewith. A potential is applied between said electron emitting grid and said other electrode for the purpose of insuring that the electron emitted will attain energy and travel through the gas with a velocity sufficient to lift the energy state of any gas molecules with which they may collide. Thus, not only can the laser be started substantially instantaneously, but also the single pass gain of the laser as well as the total power output is increased by reason of the efficient population inversion of the lasering gas which is afforded by controlling both the density and the energy levels of the free electrons in the laser tube.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
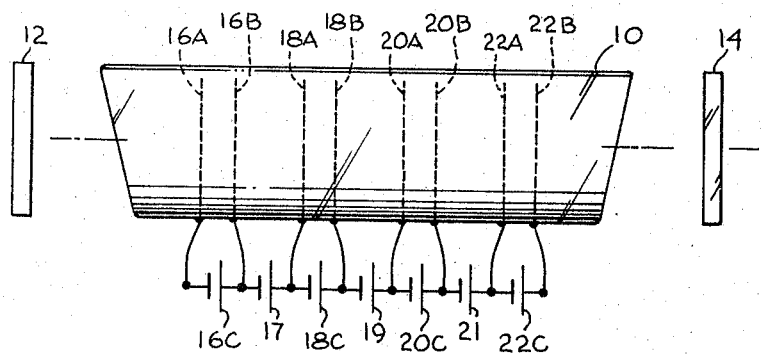
FIGURE 1 is a view in section of one embodiment of the invention.

Referring now to FIGURE 1 there may be seen a view in section of an embodiment of the invention. Since the lasering tube essentially consists of a glass tube in which the gas for performing the lasering operation is enclosed, and since the improvement in accordance with this invention, concerns itself only with the structure within said tube, other portions of the laser required for its operation are omitted in the interests of clarity. Thus, in FIGURE 1, the tube envelope 10 contains therein, gas or a gaseous mixture, for excitation in order to achieve the lasering action. At either side of the tube ends there are positioned the reflecting mirrors 12, 14, one of which, 14, is partially reflecting in order that an output may be derived therethrough.

In accordance with this invention, within the gaseous container 10, there is inserted one or more electron structures 16A, 18A, 20A, 22A. Spaced from each one of these electron emitting structures is an associated grid structure, respectively 16B, 18B, 20B, and 22B. Both the electron emitting grids and the associated grids are foraminous in order to permit the free passage therethrough of the gas molecules as well as the electrons.

Each electron emitting grid is connected to its associated grid by a potential source respectively 16C, 18C, 20C, and 22C. The spacing between the electron emitting grid and its associated grid may be on the order of less than one mean free path of the electron in the gas or at the value whereby the electron emitted from the electron emitting grid may acquire the full energy of the potential which spaces these two grids. The distance between the grid of one pair and the electron emitting grid of the succeeding pair, should be selected as one which insures a probably inelastic collision of the electrons which have been passed through the grid and the neutral gas atoms in the ground state. A few mean-free-path lengths of the electrons may be an adequate separation. The values selected for the source of potential respectively 16C, 18C, 20C, and 22C, should be appropriate for securing an energy level separation between the lasering and the ground level for the gas molecule which is used.

A source of potential respectively 17, 19, and 21 is connected between adjacent energy level excitation sources 16C, 18C, 20C, and 22C. The purpose of the sources of potential 17, 19, 21 is to minimize any electron flow backwards from the electron emitting grid of a succeeding pair to the grid of a preceding pair.

The electron emitting grids may be any of the well known types such as a thermionic emitter, a photoelectric emitter, or a field emitter, etc. In operation, electrons are emitted from each one of the emitting grids. They are accelerated by the potential difference between the emitting grid and the other grid of a pair. Such acceleration occurs within the distance between the grids. The electrons then travel into the drift region which is the space between the grid of one pair and the electron emitting grid of a succeeding pair. Within this drift region the electron can strike a neutral gas molecule and by an inelastic collision excite it to the inverted state in a one gas laser system or to the appropriate excited state in a multiple gas system. After such collision, the electron will drift to the next emitting grid where it can either be collected or passed through, or it drifts back to the preceding grid pair. In any event, there is always a sufficient number of electrons provided having a sufficiently high energy state to insure the required collisions and thereby the presence of sufficient excited gas molecules throughout the tube.

Figure 2:
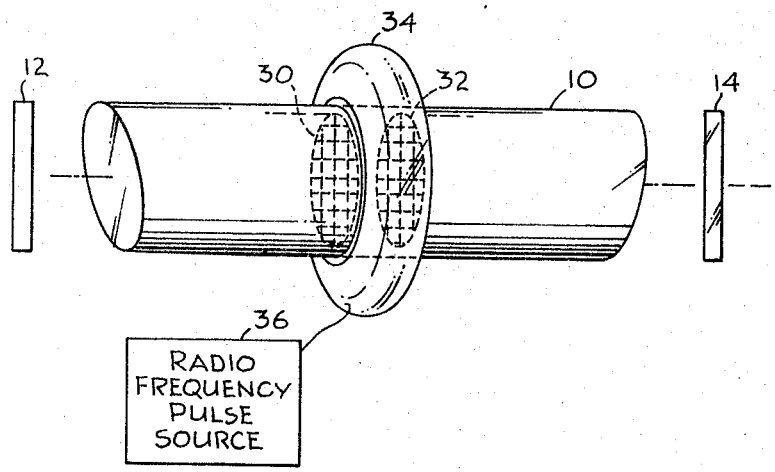
FIGURE 2 is a view in perspective of a second embodiment of the invention.

FIGURE 2 shows an arrangement for achieving the required gas molecule energization using alternating current, instead of direct current as was shown in FIGURE 1. The gas tube envelope 10 is shown again with the two reflecting mirrors respectively 12, 14. Within the gas containing envelope 10, there are provided one or more pairs of grids respectively 30, 32, both of which are electron emitting grids. These grids communicate with a radio frequency cavity which is defined by walls 34, surrounding the portion of the envelope 10 in which the grids 30, 32 are positioned. The spacing between the grids 30, 32 is less than a mean-free-path of an electron, or is otherwise optimum for the electron to obtain an optimum acceleration at the frequency of the RF excitation. These optimization techniques are straightforward to those versed in the design of microwave electron tube devices, such as the klystron.

In operation, an electron is emitted, for example, from grid 30, and is accelerated through the grid region (between grids 30, 32). It continues out through grid 32, until an inelastic collision with a gas molecule occurs. This inverts a ground state gas molecule into the proper laser level. The electron then drifts back to the grid 32, and if conditions are correct, is accelerated again, this time traveling through grid 30 until it collides with a gas molecule. Then the entire cycle repeats. In case the electron returns to the grid 32, and the phase is incorrect, it will linger at this grid for a half cycle and is either accelerated or collected. This phenomenon is quite similar to the bunching that occurs in a klystron.

By way of illustration, and not to be construed as a limitation upon the invention, there follows the data required for an actual construction of an embodiment of the invention. In an article published in 1966, entitled, "Inversion Mechanisms in Gas Lasers," by W. R. Bennett, Jr., Supplement No. 2 on Chemical Lasers, appearing on pages 3–33 of "Applied Optics," a publication of the Optical Society of America, there is an exhaustive listing of gas laser transitions. Neon is selected here as exemplary. However, this invention is equally applicable to the other gas transitions set forth in this article.

The tube envelope 10 is filled with neon to a pressure of 0.2 mm. of mercury. The data required for calculating the molecular mean-free-path in a gas may be found, for example, in a book entitled "Vacuum Tubes," by Carl R. Spangenberg, published in 1948, by McGraw-Hill Book Company. Thus the molecular mean-free-path in neon at the pressure stated is 1.21 mm., and since for electron-atom collisions it is four times as large, the electron mean-free-path is approximately 5 mm. These calculations are based on the assumption that the temperature of the molecules in the gas are 575° K., and the diameter of the neon molecules is $2.35 \times 10^{-8}$ cm.

Thus the optimum electrode spacing for electron acceleration, when taken less than the mean-free-path for electron-molecule collisions, may be 4 mm., although it is not critical over the range from 0.5 to 5 mm., with better performances for higher pressures of neon with the smaller spacing.

The drift region spacing between the grid of one pair and the electron emitting grid of the succeeding pair is 10 mm. This spacing has been selected as two mean-free-path lengths, but adequate performance may also be obtained for spacings greater than 5 mm. Thus, for a tube of 45 cm. active length, one would have a sequence of 30 grid pair structures.

Using neon, as indicated, and for operation at 6328 A., the favored voltages between an accelerator grid pair spaced apart 4 mm. are from 4 to 16 volts, and also above 19 volts. In the drift region 5 volts potential is a convenient value. The 4 to 16 volt range causes favorable transition from the 1s to the 3s and from 2p to 3s levels of neon, and the higher voltage (above 19 volts) causes the transition from the favorable ground state to 3s. Voltages in the range between 16.6 to 19 volts cause unfavorable transitions which hurt the population inversion for laser action at this wavelength.

Considering the embodiment of the invention shown in FIGURE 2, the same design criteria as are described above for the grid spacing and applied voltages may be used. However, the excitation frequency of the RF cavity should be above 1K MHz. The construction and dimensions of the RF cavity should be in accordance with well known klystron techniques. The power requirements are substantially the same as those of a klystron, having similar dimensions and frequency.

It may be seen from the foregoing description that by providing an electron emitting grid, another grid and a proper potential therebetween, the present invention not only insures that there are sufficient electrons present so that the time required to insure the occurrence of the sufficient number of collisions with gas molecules is minimized, but also that the energy level of these electrons is sufficiently high to insure that any inelastic collisions with gas molecules will invert those gas molecules to the lasering level.

What is claimed is:

1. In a gaseous laser of the type having an elongated envelope with transparent ends, containing a gas for laser action and having a reflecting mirror spaced from each one of said ends to provide a resonant cavity between said mirrors, means for emitting electrons positioned within said envelope including a pair of spaced grids positioned substantially parallel to one another and substantially orthogonal to the elongated axis of said elongated envelope, said grids having openings large enough for freely passing gas molecules and electrons therethrough, and means for applying a potential to said grids for accelerating emitted electrons until they have a sufficient energy to provide inelastic collisions with molecules of the gas within said envelope to raise the energy of said gas molecules to the proper laser level.

2. Apparatus as recited in claim 1 wherein one of said pair of spaced grids has an electron emitting material surface, and the spacing between said grids is less than the mean-free-path of an electron in said gas.

3. Apparatus as recited in claim 1 wherein there are included walls defining a radio frequency cavity extending around said tube envelope, said walls connecting to said first and second grids, and said means for applying a potential to said grids includes means for applying a radio frequency voltage pulse to said radio frequency cavity.

4. In a gaseous laser of the type having an elongated envelope with transparent ends, containing a gas for laser action and having a reflecting mirror spaced from each one of said ends to provide a resonant cavity between said mirrors, means for emitting electrons positioned within said envelope including a plurality of pairs of spaced grids positioned substantially parallel to and spaced apart from one another and orthogonal to the elongated axis of said elongated envelope, said grids having openings large enough to freely pass gas molecules and electrons therethrough, means for applying a potential between the grids of each grid pair for accelerating emitted electrons to impart a sufficient energy to provide inelastic collisions, with molecules of the gas within said envelope, and means for applying a potential between grid pairs for preventing movement of an electron from one grid pair to an adjacent grid pair.

5. Apparatus as recited in claim 4 wherein one of the grids of each grid pair has an electron emitting material surface, the spacing between the grids of each grid pair is less than the mean-free-path of an electron in said gas, and the spacing between adjacent grid pairs exceeds the mean-free-path of an electron in said gas.

No references cited.

JEWELL H. PEDERSEN, *Primary Examiner.*

E. S. BAUER, *Assistant Examiner.*